US012715540B2

(12) United States Patent
Ryan

(10) Patent No.: US 12,715,540 B2
(45) Date of Patent: Aug. 25, 2026

(54) TWO-WHEELED VEHICLE HAVING REAR SUSPENSION WITH ADJUSTABLE LEVERAGE CURVE PROGRESSION

(71) Applicant: LTP Sports Group Inc., Port Coquitlam (CA)

(72) Inventor: Colin Ryan, Maple Ridge (CA)

(73) Assignee: LTP Sports Group Inc., Port Coquitlam (CA)

( * ) Notice: Subject to any disclaimer, the term of this patent is extended or adjusted under 35 U.S.C. 154(b) by 544 days.

(21) Appl. No.: 18/340,251

(22) Filed: Jun. 23, 2023

(65) Prior Publication Data

US 2024/0059369 A1 Feb. 22, 2024

Related U.S. Application Data

(60) Provisional application No. 63/399,372, filed on Aug. 19, 2022.

(51) Int. Cl.
*B62K 25/28* (2006.01)

(52) U.S. Cl.
CPC .................................. *B62K 25/286* (2013.01)

(58) Field of Classification Search
CPC .............................. B62K 25/286; B62K 25/28
See application file for complete search history.

(56) References Cited

U.S. PATENT DOCUMENTS 6,877,591 B1 * 4/2005 Hso .......................... F16F 9/54 188/321.11
7,854,440 B2 * 12/2010 Girout .................... B62K 25/02 280/281.1
8,439,383 B2 * 5/2013 Talavasek .............. B62K 21/02 280/285
8,851,498 B2 * 10/2014 Alsop .................... B62K 25/04 280/283
8,931,794 B2 * 1/2015 O'Connor ............ B62K 25/286 280/284
10,363,988 B2 * 7/2019 Buckley ................. B62K 25/30
10,850,799 B2 * 12/2020 Chamberlain ......... B62K 25/28
11,420,707 B2 * 8/2022 Chamberlain ......... B62K 19/30
2020/0124131 A1 * 4/2020 Fillep .................. F16F 15/1207

OTHER PUBLICATIONS

Rocky Mountain, "Altitude Carbon Platform Manual," 28 pp. (Sep. 16, 2020).

* cited by examiner

*Primary Examiner* — Valentin Neacsu
*Assistant Examiner* — Michael R Stabley
(74) *Attorney, Agent, or Firm* — Klarquist Sparkman, LLP

(57) ABSTRACT

A leverage curve progression adjustment assembly for a rear suspension of a two wheeled vehicle, such as a mountain bicycle, adjusts the rate of change (slope/progression) of the leverage curve for the vehicle's suspension linkage while maintaining the same leverage ratio at the suspension's fully extended position. The leverage curve progression is adjusted by translating the first and second mounting locations of a spring/damper member along an axis of the spring/damper member using mounting hardware segments with spring/damper mounting holes positionable at multiple locations, such as flip chips with offset mounting holes, and/or mounting plates with mounting holes located at different locations.

11 Claims, 10 Drawing Sheets

48
24
12
20
38
42
22
36
44
14
26, 40
34
16

32
24
42
46
20
36
44
12
34
26, 40
22
18
14
16

TWO-WHEELED VEHICLE HAVING REAR SUSPENSION WITH ADJUSTABLE LEVERAGE CURVE PROGRESSION

CROSS-REFERENCE TO RELATED APPLICATIONS

This application claims the benefit of U.S. Provisional Patent Application No. 63/399,372, filed Aug. 19, 2022, which is incorporated by reference herein in its entirety.

FIELD

This disclosure relates generally to a two-wheeled vehicle such as a bicycle, electric assisted bicycle, or motorcycle, and particularly to a two wheeled-vehicle having a rear suspension with an adjustable leverage curve progression.

BACKGROUND

Two-wheeled vehicle suspension technology has made significant advances in the past several decades, especially rear suspension designs for mountain bikes. Modern rear suspension designs are designed to control different aspects of suspension kinematic performance, including axle path, anti-rise, anti-squat, and leverage rate. An important design goal is to tune the ride feel of the suspension to provide a desirable combination of predictability, sensitivity, and control.

One particularly important aspect of suspension kinematics in terms of ride feel is the leverage ratio, i.e., the magnitude of the reaction force at the spring/damper member for a unit of vertical force applied at the rear wheel. The applied force required to compress the rear suspension by a given magnitude is a function of the leverage ratio as well as the spring and damping rates of the spring/damper member. Holding spring and damping rate constant, a higher leverage ratio tends to make the suspension more sensitive to inputs from the road/trail surface while a lower leverage ratio tends to provide more "support", which can aid the rider in using body inputs to control the vehicle.

An important aspect of suspension feel is how the leverage ratio changes through the wheel travel, which is known as the leverage curve. It is common for suspension designs to define a higher leverage ratio at the start of suspension travel and decrease the leverage ratio as the suspension is compressed. This helps to achieve a suspension that is both sensitive to inputs from the trail or road surface while also providing adequate support to the rider to maintain control of the vehicle and generate sufficient force at the suspension's fully compressed position to prevent high energy "bottom-out".

Some users desire the ability to adjust the slope or progression of the leverage curve depending on the riding circumstances. There are known examples of two-wheeled vehicle suspension designs that employ mechanisms for adjusting the progression of the rear suspension leverage curve; these known mechanisms include "flip-chips", eccentric pivot hardware, and interchangeable hardware mounting plates, and are typically provided at a pivot location on one of the rear suspension linkages. However, these known approaches to adjusting the leverage curve progression also cause consequential changes to the leverage curve and/or vehicle geometry that can be detrimental. For example, it is common in prior art designs that a change in progression does not maintain the same leverage ratio at the fully extended position of the rear suspension, requiring additional alteration to the spring and damping rates of the spring/damper member to fully realize the benefit of the leverage curve progression adjustment. Requiring alterations to the spring/damper member characteristics in addition to the leverage curve adjustment add complexity that make this type of adjustment less useful as a means of tuning the ride characteristics of the vehicle.

SUMMARY

Figure 1:
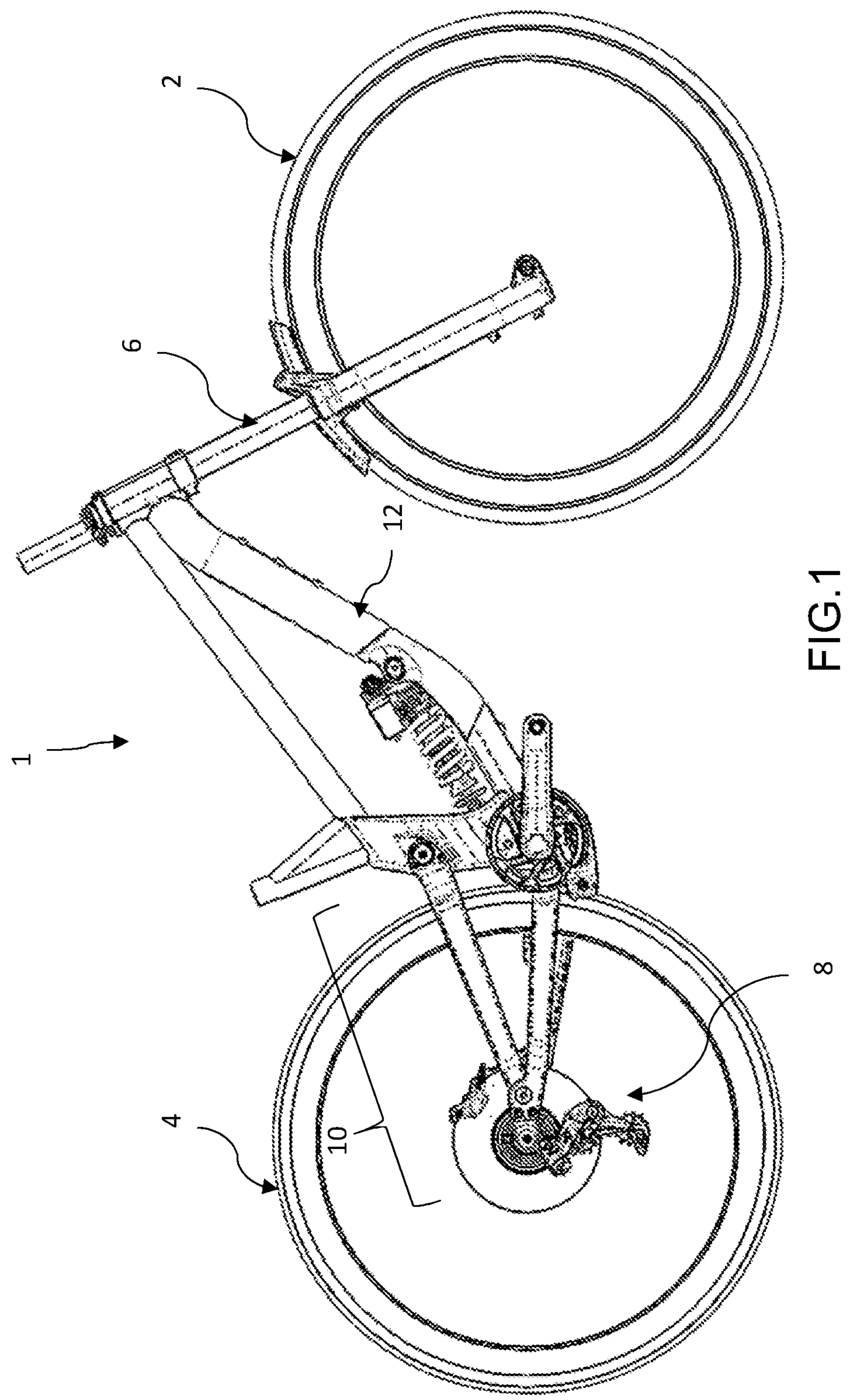
FIG. 1 is a schematic side view of a mountain bicycle comprising a leverage curve progression adjustment assembly according to one embodiment.

According to one aspect of the invention, a frame for a two-wheeled vehicle comprises a front triangle, a rear suspension comprising at least one pivoting member and a shock assembly, and a leverage curve adjustment assembly comprising at least one first segment removably mountable to the front triangle and having a first shock assembly mounting hole, and at least one second segment removably mountable to the at least one pivoting member and having a second shock assembly mounting hole. The first and second shock assembly mounting holes are spaced apart and movable along an axis of the shock assembly between a first pair of mounting hole locations and a second pair of mounting hole locations. The shock assembly is pivotably mountable at the first pair of mounting hole locations to provide a first leverage curve for the rear suspension, and is pivotably mountable at the second pair of mounting hole locations to provide a second leverage curve for the rear suspension having a different progression than the first leverage curve.

The at least one first segment can be a first flip chip and the at least one second segment can be a second flip chip. The first and second shock assembly mounting holes can be respectively offset on the first and second flip chips. The first and second shock assembly mounting holes can be offset by the same distance. The front triangle and the at least one pivoting member can each comprise a receptacle configured to receive a respective one of the first and second flip chips in a first position and a reversed second position.

Alternatively, at least one first segment can be a kit of first chips with each first chip having the first shock assembly mounting hole in a different location and the at least one second segment can be a kit of second chips with each second chip having the second shock assembly hole in a different location. The front triangle and the at least one pivoting member can each comprise a receptacle configured to receive one set of the first and second chips to define the first pair of mounting hole locations and to receive another set of the first and second flip chips to define the second pair of mounting hole locations.

Alternatively, the first segment can comprise a kit of interchangeable mounting plates each mountable to the front triangle, wherein the first shock mounting hole is located at a different location on each of the interchangeable mounting plates. The second segment can be a flip chip with the second shock assembly mounting hole offset on the flip chip. The at least one pivoting member can comprise a receptacle configured to receive the flip chip in a first position and in a reversed second position.

The rear suspension can be a single pivot type comprising one pivoting member, or a four-bar type comprising three pivoting members and front triangle. Alternatively, the rear suspension can comprise: an upper connecting member having a first pivotable coupling for pivotably coupling a first location on the upper connecting member to a first location on the front triangle; a rear axle floating member having a rear axle and a second pivotable coupling pivotably coupling a second location on the upper connecting member to a first location on the rear axle floating member; a lower connecting member having a third pivotable coupling pivotably coupling a second location on the rear axle floating member to a first location on the lower connecting member, and a fourth pivotable coupling for pivotably coupling a second location on the lower connecting member to a second location on the front triangle; an upper shock actuation member having a fifth pivotable coupling for pivotably coupling a first location on the upper shock actuation member to a third location of the front triangle; and a pushrod member having a sixth pivotable coupling pivotably coupling a second location on the upper shock actuation member to a first location on the pushrod member, and a seventh pivotable coupling pivotably coupling a second location on the pushrod member to a third location on the lower connecting link member, wherein the second segment is removably connected to a third location of the upper shock actuation member.

According to another aspect of the invention, a frame for a two-wheeled vehicle comprises: a front triangle, a rear suspension comprising at least one pivoting member and a shock assembly; and a leverage curve adjustment assembly comprising a first segment fixed to or integral with the front triangle and having multiple first shock assembly mounting holes along an axis of the shock assembly, and a second segment fixed to or integral with the at least one pivoting member and having multiple second shock assembly mounting holes along an axis of the shock assembly. A first pair of the first and second shock assembly mounting holes can be located in a first pair of locations, and a second pair of the first and second shock assembly mounting holes can be located in a second pair of locations. The shock assembly can be pivotably mountable at the first pair of locations to provide a first leverage curve for the rear suspension, and can be pivotably mountable at the second pair of locations to provide a second leverage curve for the rear suspension having a different progression than the first leverage curve.

According to yet another aspect of the invention, a frame for a two-wheeled vehicle comprises: a front triangle; a rear suspension comprising at least one pivoting member and a shock assembly; and a leverage curve adjustment assembly comprising at least one first segment removably mountable to one of the front triangle and the at least one pivoting member and having a first shock assembly mounting hole, and a second segment fixed to or integral with the other of the front triangle and the at least one pivoting member and having multiple second shock assembly mounting holes along an axis of the shock assembly. The first shock assembly mounting hole can be movable along an axis of the shock assembly between a first position and a second position. The first shock assembly mounting hole is in the first position and one of the second shock assembly mounting holes defines a first pair of mounting hole locations. The first shock assembly mounting hole is in the second position and another of the second shock assembly mounting holes defines a second pair of mounting hole locations. The shock assembly can be pivotably mountable at the first pair of mounting hole locations to provide a first leverage curve for the rear suspension, and can be pivotably mountable at the second pair of mounting hole locations to provide a second leverage curve for the rear suspension having a different progression than the first leverage curve.

DETAILED DESCRIPTION OF EMBODIMENTS

Embodiments disclosed herein relate generally to a two wheeled vehicle, such as a mountain bicycle, having a frame with a rear suspension comprising a leverage curve progression adjustment assembly. The leverage curve progression adjustment assembly adjusts the rate of change (slope/progression) of the leverage curve for the vehicle's suspension linkage while maintaining the same leverage ratio at the suspension's fully extended position. In some embodiments, the leverage curve progression is adjusted by translating the first and second mounting locations of a spring/damper member along an axis of the spring/damper member using hardware segments with spring/damper mounting holes positionable at multiple locations. In some embodiments, the hardware segments are removably mounted to the frame and can comprise a pair of single segments each with a respective first and second spring/damper mounting hole, wherein each single segment is positionable in two or more positions to alter the location of the first and second spring/damper mounting holes; or comprise a kit of interchangeable segments, wherein each interchangeable segment in the kit has the first or second spring/damper mounting hole in a different location; or comprise a combination of a single segment for one spring/damper mounting hole location and a kit of interchangeable segments for the other spring/damper mounting hole location. For example, the hardware segments can comprise a pair of flip chips each with an offset mounting hole, and/or a kit of interchangeable mounting plates with mounting holes located at different locations. In some other embodiments, the hardware segments are fixed or integrated into the frame, in which case each segment features multiple spring/damper mounting holes at different locations along the axis of the spring/damper member. In yet other embodiments, the hardware segments comprise a combination of removably mountable and fixed/integrated segments.

In some embodiments, the mounting hardware segments are configured to translate the first and second mounting locations by an equal magnitude; this ensures the distance between mounting locations remains consistent with the extended length of the spring/damper member to avoid alterations to the geometry of the two-wheeled vehicle. The leverage curve progression adjustment assembly is expected to enable adjusting the leverage curve in a way that is desirable for tuning the ride characteristics of the suspension. Increasing the slope (progression) of the leverage curve increases the level of support and bottom out resistance the rear suspension provides to the rider without requiring variation to the spring rate and damping rates defined by the spring/damper member that is required in prior art suspension geometry adjustment mechanism. Conversely, decreasing the progression of the leverage curve reduces the level of support and bottom out resistance, but increases the level of sensitivity, again without the need to alter the spring and damping rates.

Figure 2:
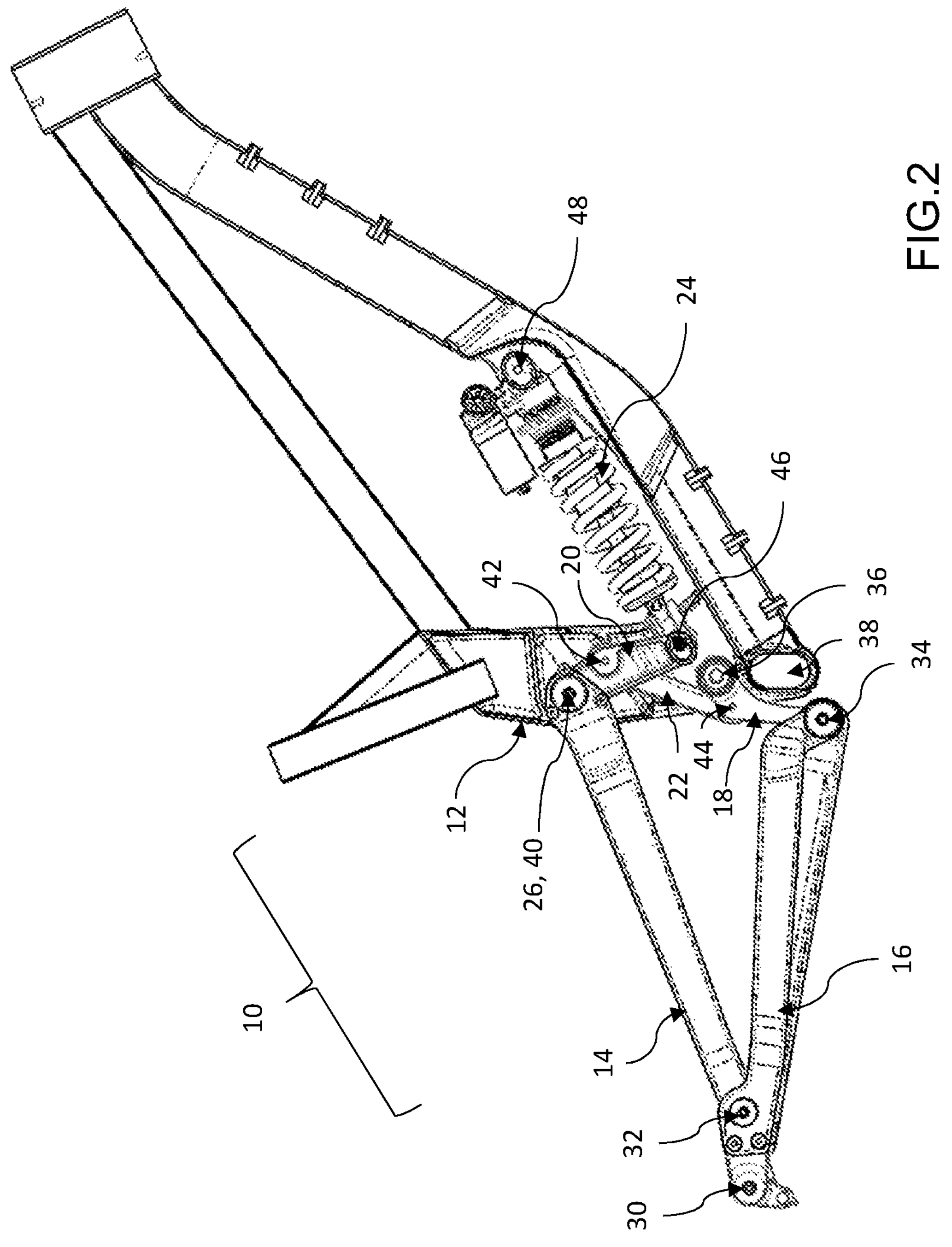
FIG. 2 is a side view of a frame of the bicycle having a rear suspension and the leverage curve progression adjustment assembly.
Figures 3, 4:
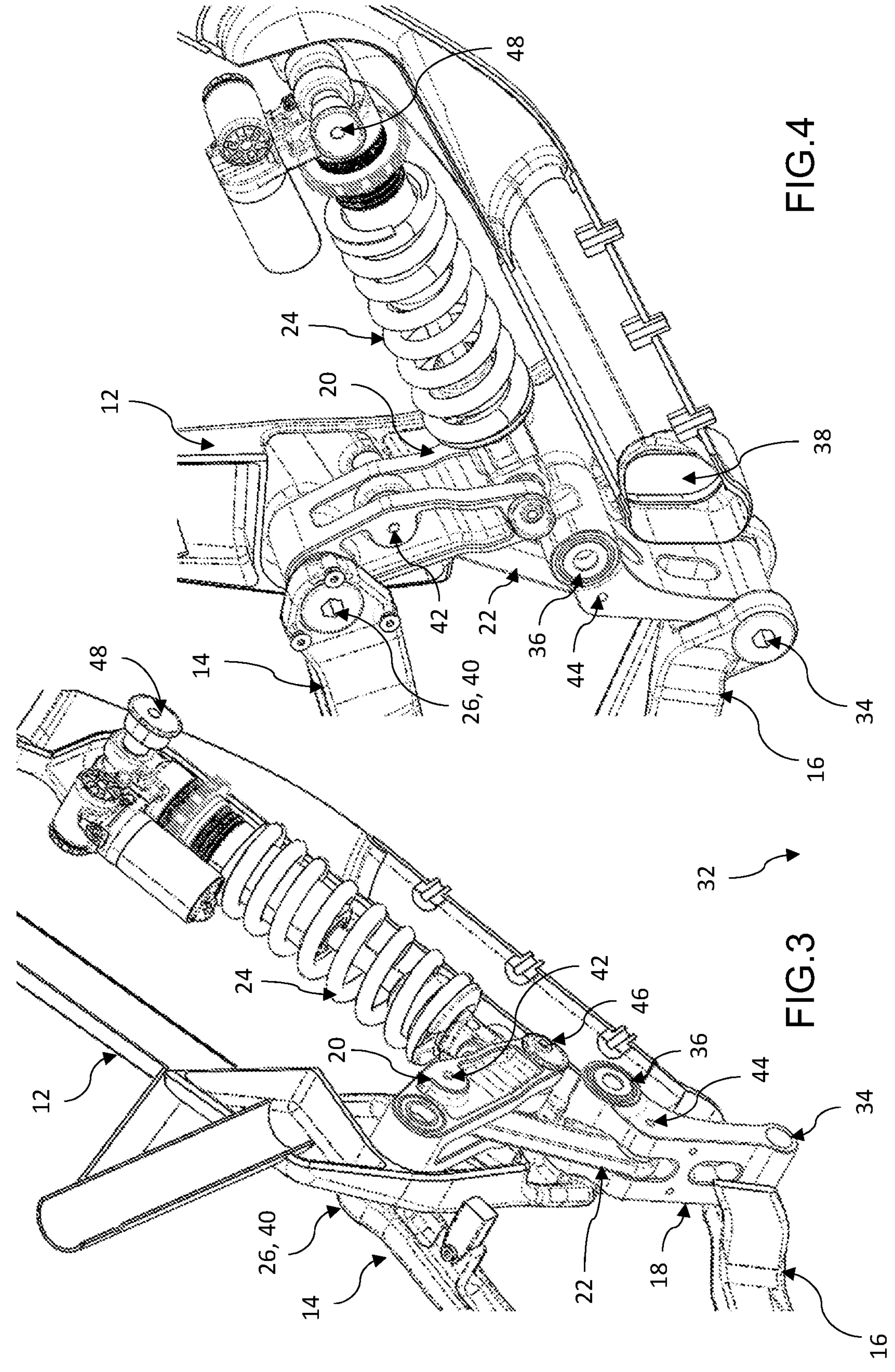
FIG. 3 is a rear isometric view of a portion of the rear suspension and the leverage curve progression adjustment assembly.
FIG. 4 is a front isometric view of the portion of the rear suspension and the leverage curve progression adjustment assembly.
Figure 10:
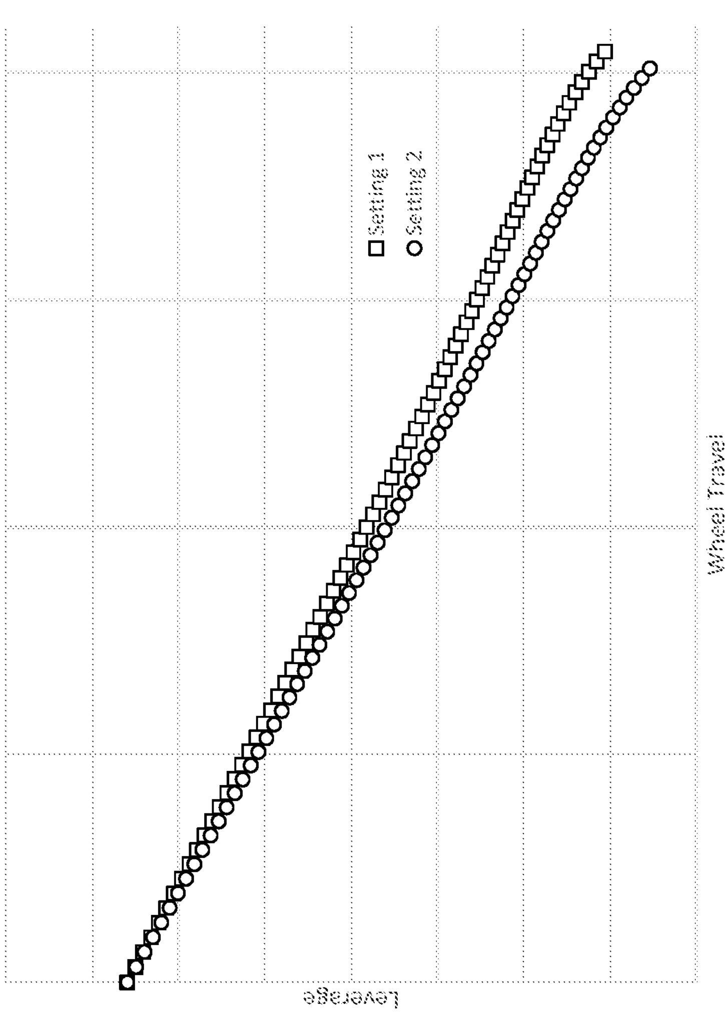
FIG. 10 is a graph of the leverage curves of the bicycle rear suspension with the leverage curve progression adjustment assembly in the first and second positions.
Figure 11:
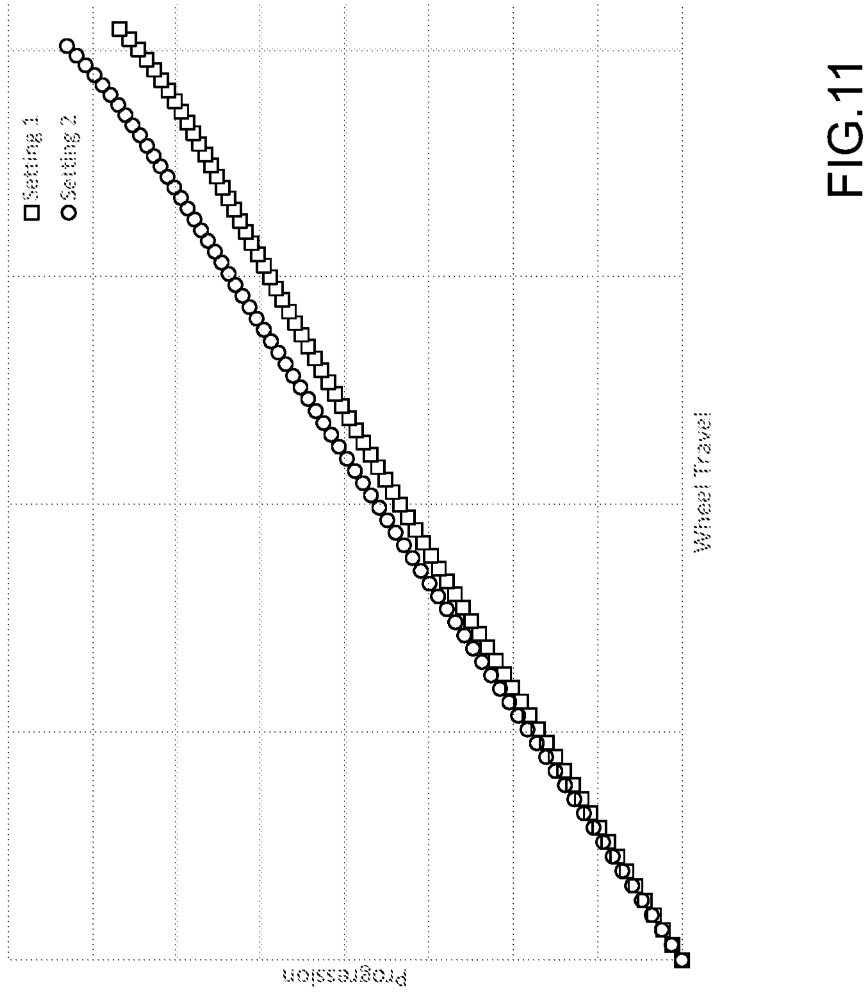
FIG. 11 is a graph of the progression curves of the bicycle rear suspension with the leverage curve progression adjustment assembly in the first and second positions.
Figures 12A, 12B:
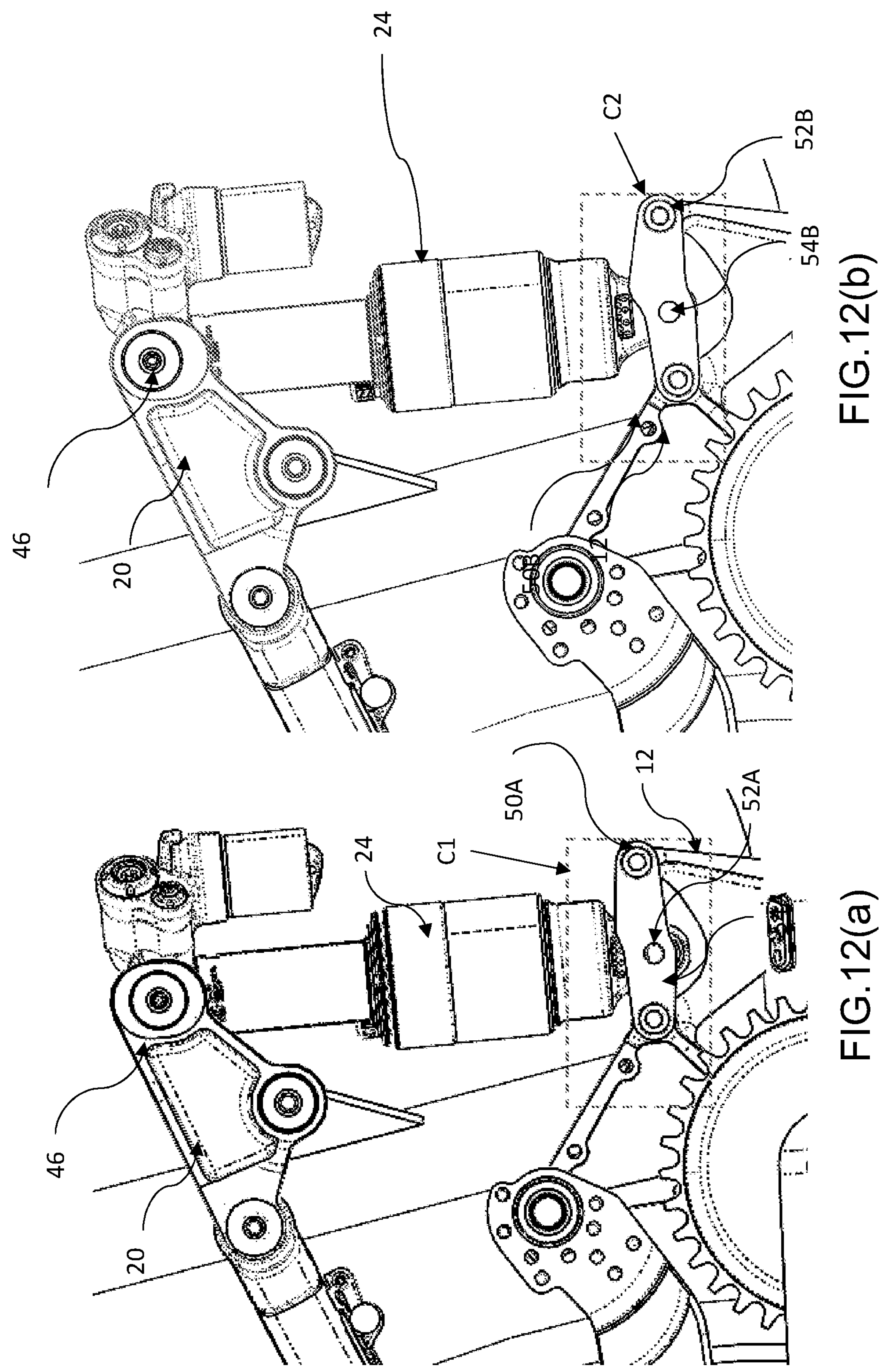
FIGS. 12(*a*) and (*b*) are side views of a portion of the rear suspension comprising a leverage curve progression adjustment assembly according to a second embodiment, wherein the leverage curve adjustment mechanism is shown in a first position in FIG. 12(*a*) and in a second position in FIG. 12(*b*).
Figure 13:
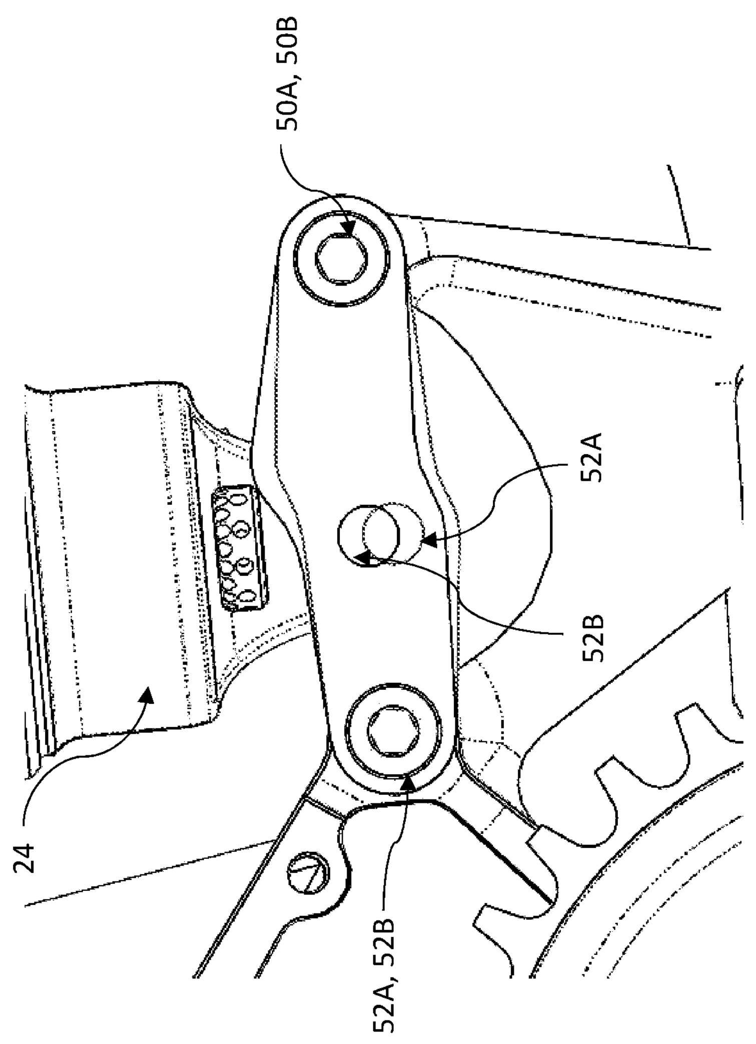
FIG. 13 is a detail view of areas C1 and C2 from FIGS. 12(*a*) and 12(*b*), showing first and second lower mounting plates mounted to the mountain bicycle.

A first embodiment is shown in FIGS. 1 to 11 and a second embodiment is shown in FIGS. 12 and 13. Referring to FIG. 1, a mountain bicycle 1 comprises front and rear wheels 2, 4, front fork and front suspension 6, drivetrain components (e.g. crank, derailleurs, gears, brakes) 8, a frame comprising a rear suspension 10 with a leverage curve progression adjustment assembly and a front triangle 12, and other components not illustrated including a seat post, seat, and handlebars. Referring to FIGS. 2-4, the rear suspension 10 comprises a plurality of pivoting members, namely: an upper connecting member 14, a rear axle floating member 16, a lower connecting member 18, an upper shock actuation member 20, a pushrod member 22, and a spring/damper member (otherwise referred to as a shock assembly) 24. These pivoting members can be composed of a metal alloy such as aluminum, steel or titanium or a composite material such as a carbon fibre composite.

A first pivotable coupling 26 pivotably couples a first end of the upper connecting member 14 to a first location on the front triangle 12. A rear axle 30 extends through the first end of the rear axle floating member 16. A second pivotable coupling 32 pivotably couples a second end of the upper connecting member 14 to a location on the rear axle floating member 16 that is forward of the rear axle 30. A third pivotable coupling 34 pivotably couples a second end on the rear axle floating member 16 to a first end of the lower connecting member 18. A fourth pivotable coupling 36 pivotably couples a second end of the lower connecting member 18 to a second location on the front triangle 12, below the first pivotable coupling 26 and above a bottom bracket 38.

A fifth pivotable coupling 40 is concentric with the first pivotable coupling 26 and pivotably couples a first end of the upper shock actuation member 20 to the first location on the front triangle 12. A sixth pivotable coupling 42 is located on a portion of the upper shock actuation member 20 in between the pivotable couplings 40, 46 and pivotably couples the upper shock actuation member 20 to a first end of the pushrod member 22. A seventh pivotable coupling 44 is located on a portion on the lower connecting member 18 in between pivotable couplings 34, 36 and pivotably couples a second end of the pushrod member 22 to the lower connecting member 18.

A second flip chip 46 serves as an eighth pivotable coupling 46 to pivotably couple a second end of the upper shock actuation member 20 to a first end of the shock assembly 24. A first flip chip 48 serves as a ninth pivotable coupling 48 to pivotably couple a second end on the shock assembly 24 to a third location on the front triangle 12. As will be described below, the flip chips 46 and 48 comprise the mounting hardware segments of the leverage curve progression adjustment assembly and are movable between multiple positions to change the leverage curve progression of the rear suspension 10.

Alternatively, the pivotable couplings 26, 32, 34, 36, 40, 42, 44, 46 can be located at different locations on the upper connecting and rear axle floating members 14, 16, lower connecting link member 18, upper shock actuation member 20, and pushrod member 22, e.g., inboard from the ends of these members (not shown). These different locations can be selected by a suspension designer to alter the suspension kinematics and particularly the leverage curve of the rear suspension.

In alternative embodiments (not shown), the leverage curve progression assembly can be installed in other types of rear suspension designs, having at least one pivoting member and a shock assembly, such as four-bar and single pivot type suspensions. The mounting hardware segments (e.g., flip chips) are mounted at the first and second shock assembly pivot locations, and the suspension linkages and front triangle are adapted accordingly to receive the mounting hardware segments.

Figures 5A, 5B:
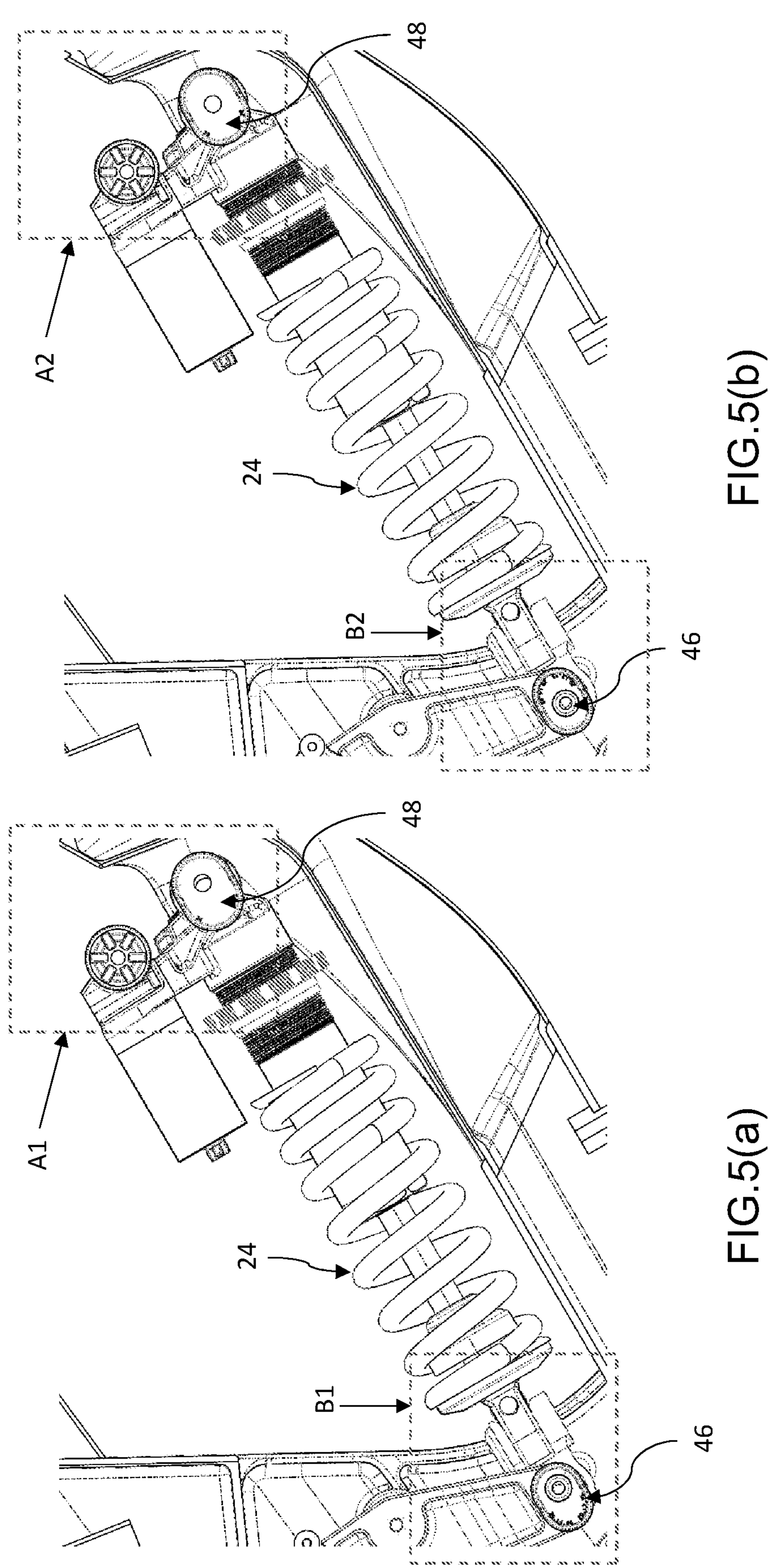
FIGS. 5(*a*) and (*b*) are side views of the portion of the rear suspension and the leverage curve progression adjustment assembly in a first position (FIG. 5(*a*)) and a second position (FIG. 5(*b*)).
Figures 6, 7:
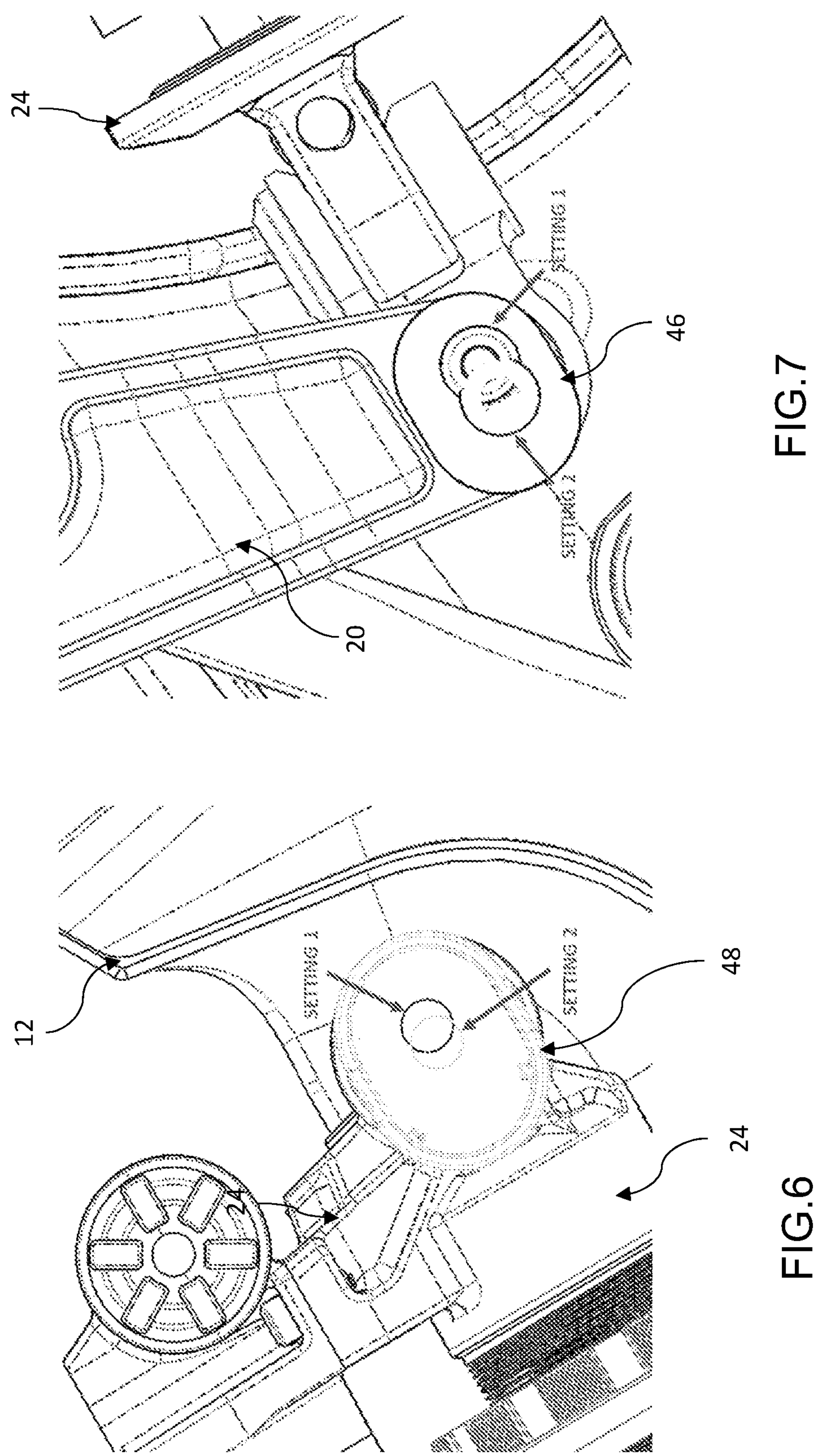
FIG. 6 is a detail view of areas A1 and A2 from FIGS. 5(*a*) and 5(*b*), showing a first flip chip of the leverage curve progression adjustment assembly in first and second positions.
FIG. 7 is a detail view of areas B1 and B2 from FIGS. 5(*a*) and 5(*b*) showing a second flip chip of the leverage curve progression adjustment assembly in first and second settings.
Figure 9:
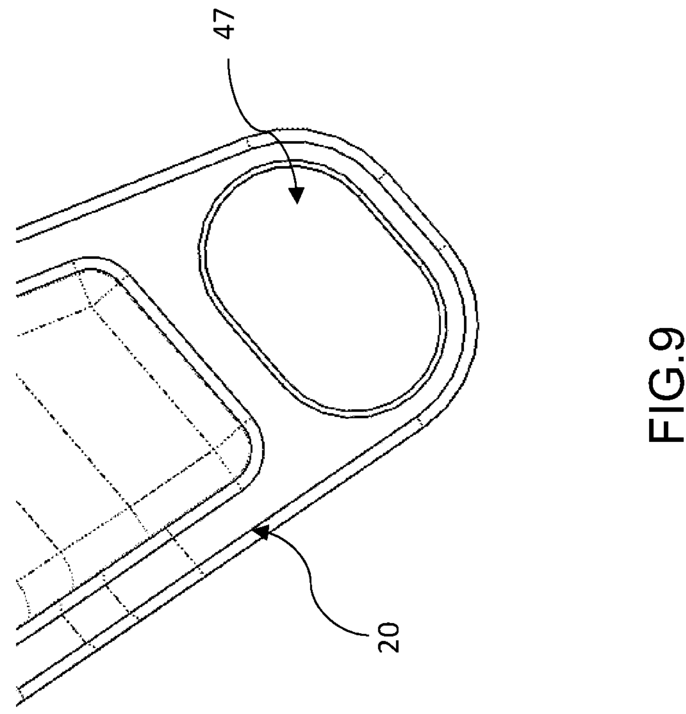
FIG. 9 is a detail view of a shock actuator member of the mountain bicycle showing a second flip chip receptacle.
Figure 8:
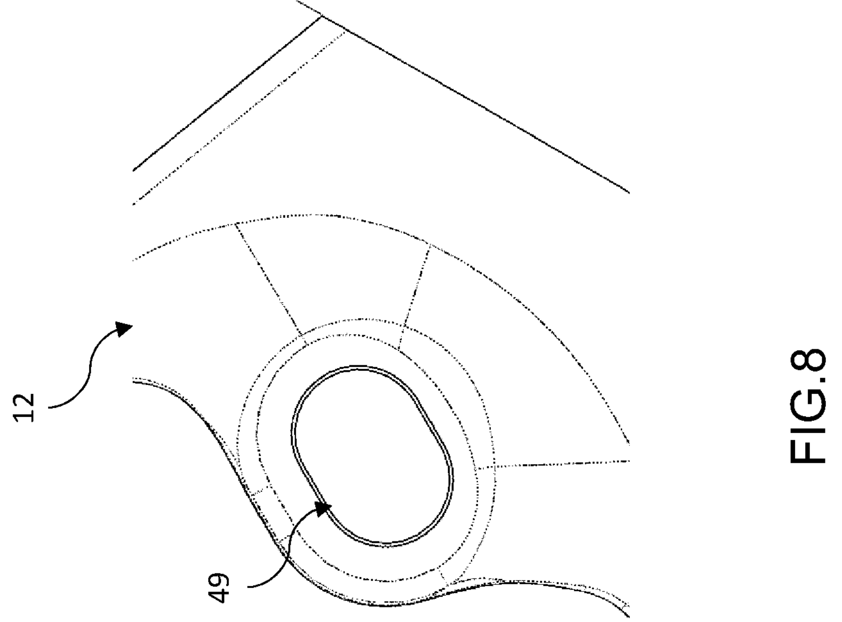
FIG. 8 is a detail view of a front triangle of the mountain bicycle showing a first flip chip receptacle.

Referring particularly to FIGS. 5(*a*) and (*b*), the first and second flip chips 48, 46 each comprise an elongated chip with an offset shock assembly mounting hole for pivotably mounting to the first and second ends of the shock assembly 24. In this embodiment, the elongated chip has an oval shape, but the chip can have other shapes in other embodiments, provided the chip has sufficient space to accommodate an offset shock assembly mounting hole. The second flip chip 46 is seated in a second receptacle 47 with a corresponding oval shape in the upper shock actuation member 20 (see FIG. 9); the oval chip is symmetrical so the second flip chip 46 can be seated in the receptacle in two positions, namely a first position as shown in FIG. 5(*a*) and a second reversed or "flipped" position as shown in FIG. 5(*b*). Similarly, the first flip chip 48 is seatable in two different positions in an oval first receptacle 49 at a first shock pivot mount on the downtube of the front triangle 12 (see FIG. 8), namely a first position as shown in FIG. 5(*a*) and a second flipped position as shown in FIG. 5(*b*). In the first position (see "SETTING 1" in FIGS. 6 and 7), the shock assembly mounting holes of the first and second flip chips 48, 46 are located at a higher location along the shock assembly axis, and in the second position (see "SETTING 2" in FIGS. 6 and 7), the shock assembly mounting holes of the first and second flip chips 48, 46 are located at a lower location along on the shock assembly axis.

Notably, the shock assembly mounting holes in the first and second flip chips 48, 46 are movable between their two positions along the axis of the shock assembly 24. By translating the shock assembly mounting holes' locations along the shock assembly axis, the same leverage ratio is maintained at the suspension's fully extended position. The benefit is that the spring/damper characteristics result in very similar sensitivity and ride height characteristics with the only change being the alteration in support that results from increasing/decreasing the progression of the leverage curve.

The effect of changing the shock assembly mounting hole locations on the leverage curve ratio and progression can be seen in FIGS. 10 and 11. Notably, changing the shock assembly mounting holes at both ends of the shock assembly 24 and along the axis of the shock assembly 24 changes the leverage curve progression while maintaining the same leverage ratio at full extension.

In this embodiment, the shock assembly mounting holes in the first and second flip chips 46, 48 are offset by the same distance. This results in the shock assembly mounting holes' locations being translated by an equal magnitude between the first and second positions, ensuring the distance between mounting points remains consistent with the extended length of the spring/damper member. Consequently, the geometry of the two-wheeled vehicle is unaltered. However, in alternate embodiments where it is desirable to alter the vehicle geometry as well as the leverage curve progression, the shock assembly mounting hole offsets can be different between the first and second flip chips 48, 46.

Although the illustrated embodiments show the first and second flip chips mountable in two positions, in alternate embodiments (not shown), the flip chips can be mounted in more than two positions, e.g., the flip chips can be square shaped and mountable in four different positions. In another alternative embodiment (not shown), a kit of interchangeable chips can be provided with the mounting holes located in different locations, and different chips can be swapped to move the mounting hole between different locations.

Alternate Embodiments

Referring to FIGS. 12(*a*), 12(*b*), and 13, a second embodiment of the leverage curve progression adjustment assembly comprises the second flip chip 46 of the first embodiment and a kit of interchangeable mounting plates 50A, 50B. The shock actuation member 20 is provided with an oval receptacle like in the first embodiment to receive the second flip chip 46, which can be mounted in two different positions in the receptacle like in the first embodiment. The kit of interchangeable plates comprises first and second interchangeable mounting plates 50A, 50B each have an elongated plate with a pair of end mounting holes 52A, 52B at each respective end of the plate for fixedly coupling to the front triangle 12, and a central shock assembly mounting hole 54A, 54B for pivotably coupling to the first pivot of the shock assembly 24. Referring to FIG. 13, the central shock assembly mounting hole 54A of the first interchangeable mounting plate 50A is located lower on the plate than the central shock assembly mounting hole 54B of the second interchangeable mounting plate 50B.

Unlike the first embodiment, no receptacle is provided for receiving the interchangeable mounting plates 50A, 50B in two different positions. Instead, the first and second interchangeable mounting plates 50A, 50B can be interchangeably mounted to the mountain bicycle 1 to shift the lower mounting location of the shock assembly 24. When the first interchangeable mounting plate 50A is mounted and the first flip chip 48 is mounted in its lower position, the shock assembly mounting locations are located in a first (lower) setting; when the second interchangeable mounting plate 50B is mounted and the first flip chip 48 is mounted in its upper position, the shock assembly mounting locations are located in a second (higher) setting, with leverage and progression curves similar to those of the first embodiment.

In an alternative embodiment (not shown), the leverage curve progression adjustment assembly comprises first and second segments that are permanently fixed or integrated into the front triangle and suspension pivot member. Each of the first and second segments feature multiple shock assembly mounting holes spaced along the shock assembly axis, which allow the shock assembly to be mounted in at least two different positions, to produce at least the two different leverage curves shown in FIGS. 10 and 11.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

As used herein, a reference to "about" or "approximately" a number or to being "substantially" equal to a number means being within +/−10% of that number.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A frame for a two-wheeled vehicle, comprising:

a front triangle;

a rear suspension comprising a plurality of pivoting members and a shock assembly, the plurality of pivoting members comprising:

an upper connecting member having a first pivotable coupling for pivotably coupling a first location on the upper connecting member to a first location on the front triangle;

a rear axle floating member having a rear axle and a second pivotable coupling pivotably coupling a second location on the upper connecting member to a first location on the rear axle floating member;

a lower connecting member having a third pivotable coupling pivotably coupling a second location on the rear axle floating member to a first location on the lower connecting member, and a fourth pivotable coupling for pivotably coupling a second location on the lower connecting member to a second location on the front triangle;

an upper shock actuation member having a fifth pivotable coupling for pivotably coupling a first location on the upper shock actuation member to a third location of the front triangle; and a pushrod member having a sixth pivotable coupling pivotably coupling a second location on the upper shock actuation member to a first location on the pushrod member, and a seventh pivotable coupling pivotably coupling a second location on the pushrod member to a third location on the lower connecting link member; and a leverage curve adjustment assembly comprising at least one first segment removably mountable to the front triangle and having a first shock assembly mounting hole, and at least one second segment removably mountable to a third location of the upper shock actuation member and having a second shock assembly mounting hole;

wherein the first and second shock assembly mounting holes are spaced apart and movable along an axis of the shock assembly between a first pair of mounting hole locations and a second pair of mounting hole locations, and wherein the shock assembly is pivotably mountable at the first pair of mounting hole locations to provide a first leverage curve for the rear suspension, and is pivotably mountable at the second pair of mounting hole locations to provide a second leverage curve for the rear suspension having a different progression than the first leverage curve.

2. The frame as claimed in claim 1, wherein the at least one first segment is a first flip chip and the at least one second segment is a second flip chip and the first and second shock assembly mounting holes are respectively offset on the first and second flip chips, and wherein the front triangle and the upper shock actuation member each comprise a receptacle configured to receive a respective one of the first and second flip chips in a first position and a reversed second position.

3. The frame as claimed in claim 2, wherein the first and second shock assembly mounting holes are offset by the same distance.

4. The frame as claimed in claim 1, wherein the at least one first segment is a kit of first chips with each first chip having the first shock assembly mounting hole in a different location and the at least one second segment is a kit of second chips with each second chip having the second shock assembly hole in a different location, and wherein the front triangle and the upper shock actuation member each comprise a receptacle configured to receive one set of the first and second chips to define the first pair of mounting hole locations and to receive another set of the first and second flip chips to define the second pair of mounting hole locations.

5. The frame as claimed in claim 1, wherein:

the at least one first segment comprises a kit of interchangeable mounting plates each mountable to the front triangle, wherein the first shock assembly mounting hole is located at a different location on each of the interchangeable mounting plates;

the at least one second segment is a flip chip and the second shock assembly mounting hole is offset on the flip chip; and the at least one pivoting member comprises a receptacle configured to receive the flip chip in a first position and in a reversed second position.

6. A frame for a two-wheeled vehicle, comprising:

a front triangle;

a rear suspension comprising at least one pivoting member and a shock assembly; and a leverage curve adjustment assembly comprising a first segment fixed to or integral with the front triangle and having multiple first shock assembly mounting holes along an axis of the shock assembly, and a second segment fixed to or integral with the at least one pivoting member and having multiple second shock assembly mounting holes along an axis of the shock assembly;

wherein a first pair of the first and second shock assembly mounting holes are located in a first pair of locations, and a second pair of the first and second shock assembly mounting holes are located in a second pair of locations, and wherein the shock assembly is pivotably mountable at the first pair of locations to provide a first leverage curve for the rear suspension, and is pivotably mountable at the second pair of locations to provide a second leverage curve for the rear suspension having a different progression than the first leverage curve.

7. The frame as claimed in claim 6, wherein the at least one first segment is a first flip chip and the at least one second segment is a second flip chip and the first and second shock assembly mounting holes are respectively offset on the first and second flip chips, and wherein the front triangle and the at least one pivoting member each comprise a receptacle configured to receive a respective one of the first and second flip chips in a first position and a reversed second position.

8. The frame as claimed in claim 7, wherein the first and second shock assembly mounting holes are offset by the same distance.

9. The frame as claimed in claim 6, wherein the at least one first segment is a kit of first chips with each first chip having the first shock assembly mounting hole in a different location and the at least one second segment is a kit of second chips with each second chip having the second shock assembly hole in a different location, and wherein the front triangle and the at least one pivoting member each comprise a receptacle configured to receive one set of the first and second chips to define the first pair of mounting hole locations and to receive another set of the first and second flip chips to define the second pair of mounting hole locations.

10. The frame as claimed in claim 6, wherein the rear suspension is a single pivot rear suspension comprising one pivoting member.

11. The frame as claimed in claim 6, wherein the rear suspension is a four-bar rear suspension comprising three pivoting members.

* * * * *